United States Patent
Tang (10) Patent No.: US 10,064,393 B1
(45) Date of Patent: Sep. 4, 2018

(54) WATER STORAGE TYPE BIRD FEEDING DEVICE

(71) Applicant: LF Centennial Limited, Tortola (VG)

(72) Inventor: Yu Tang, Shanghai (CN)

(*) Notice: Subject to any disclaimer, the term of this patent is extended or adjusted under 35 U.S.C. 154(b) by 0 days.

(21) Appl. No.: 15/798,950

(22) Filed: Oct. 31, 2017

(51) Int. Cl.
*A01K 39/04* (2006.01)

(52) U.S. Cl.
CPC .................... *A01K 39/04* (2013.01)

(58) Field of Classification Search
CPC .. A01K 39/011; A01K 39/012; A01K 39/014; A01K 31/14; A01K 31/06; A01K 31/12; A01K 5/025
USPC ............... 119/51.5, 52.3, 52.4, 57.8, 57.9
See application file for complete search history.

(56) References Cited

U.S. PATENT DOCUMENTS

| | | | | |
|---|---|---|---|---|
| 5,947,054 | A * | 9/1999 | Liethen | A01K 39/0206 119/52.3 |
| 6,253,707 | B1 * | 7/2001 | Cote | A01K 39/0106 119/57.9 |
| 7,448,346 | B1 * | 11/2008 | Stone | A01K 31/12 119/52.3 |
| 7,565,881 | B2 * | 7/2009 | Smothers | A01K 39/012 119/72 |
| 8,191,508 | B2 * | 6/2012 | Greenwood | A01K 39/012 119/52.2 |

FOREIGN PATENT DOCUMENTS

CN  201620719387.0 U  2/2017

\* cited by examiner

*Primary Examiner* — Yvonne Renee Abbott-Lewis
(74) *Attorney, Agent, or Firm* — Seed IP Law Group LLP (57) ABSTRACT

A water storage type bird feeding device includes: a water storage part, which is in a cylindrical shape for water storage, a food storage part, which is arranged below the water storage part and comprises a cylindrical portion and a disk-like portion, the cylindrical portion and the disk-like portion are in communication to form a communicating cylinder portion, the disk-like portion is used to save food, a column stopper, which is able to move up and down in the communicating cylinder portion; a hook, which is connected to the column stopper for hanging the bird feeding device, wherein the communicating cylinder portion comprises a smallest diameter portion at a central portion thereof in a vertical direction, and the diameter of the column stopper is larger than an inner diameter of the smallest diameter portion.

3 Claims, 10 Drawing Sheets

WATER STORAGE TYPE BIRD FEEDING DEVICE

TECHNICAL FIELD

The present description relates to a bird feeding device, and in particular, relates to a bird feeding device having two functions of water storage and food storage, which can easily store and replace water.

BACKGROUND

More and more families have pets, and many of the pets are birds. In addition, people are increasingly concerned about the birds that are in a natural environment. Hence, many bird feeding devices are provided in the places where birds frequently visit to help the survival of wild birds. As a result, bird feeding devices are increasingly used in people's life. However, most of the existing bird feeding devices only have food feeding function, and do not have the function of water feeding. Although a small number of bird feeding devices have the function of providing water, it is very cumbersome to change water for these devices, in addition, the water feeding part and food feeding part of the device can easily connect, which may compromise the quality of the water.

BRIEF SUMMARY

The embodiments in accordance with the present description provide a bird feeding device with two functions of water feeding and food feeding, in which the water storage part is on top of the food storage part, so the entire bird feeding device occupies only a small area, and thus saves space. In addition, a column stopper is provided for the device, which functions to completely separate the water storage part from the food storage part, so as to ensure the cleanness of water and food stored therein. On the other hand, due to the design of the column stopper, it becomes easier to change the water in the bird feeding device, and the device can be cleaned easily. Thus, the water in the bird feeding device can be changed in time and the operation for water change is simplified.

According to an exemplary aspect of the described embodiments, a bird feeding device is provided, which is characterized in that the bird feeding device comprises:

a water storage part, which is in a cylindrical shape for water storage;

a food storage part, which is arranged below the water storage part and comprises a cylindrical portion and a disk-like portion, the cylindrical portion and the disk-like portion are in communication to form a communicating cylinder portion, the disk-like portion is configured to store food;

a column stopper, movable up and down in the communicating cylinder portion;

a hook, connected to the column stopper for hanging the bird feeding device, wherein the communicating cylinder portion comprises a smallest diameter portion at a central portion thereof in a vertical direction, and the diameter of the column stopper is larger than an inner diameter of the smallest diameter portion.

In other embodiments, the bird feeding device further comprises a blocking portion, which is arranged on an inner wall of the smallest diameter portion of the communicating cylinder portion to block the column stopper from moving up and down.

In other embodiments, when the column stopper moves upwards to the smallest diameter portion, the column stopper has an elastic deformation to seal the smallest diameter portion, and block the communication between the water storage part and the cylindrical portion of the food storage part to divide the communicating cylinder portion into two parts. When the column stopper moves downwards to the smallest diameter portion, the column stopper has an elastic restoration to resume the communication between the water storage part and the food storage part.

The specific aspects of embodiments described in this application will be described in further detail with reference to the accompanying drawings and exemplary embodiments, and the advantages of the described embodiments will be further clarified.

BRIEF DESCRIPTION OF THE DRAWINGS

The drawings described herein are intended to help further understanding of the embodiments described herein, and constitute a part of the present disclosure, but the description thereof is for the purpose of describing the exemplary embodiments and not as limitations of embodiments in accordance with the present disclosure.

DETAILED DESCRIPTION

Aspects of the subject matter described in this application will be further described clearly and completely in reference with the specific embodiments described herein and the accompanying drawings. Obviously, the described embodiments are only some exemplary embodiments, rather than all of the embodiments. Based on the described embodiments, all other embodiments obtained by a person of ordinary skill in the art without making creative efforts are within the scope of the present disclosure.

Figure 1:
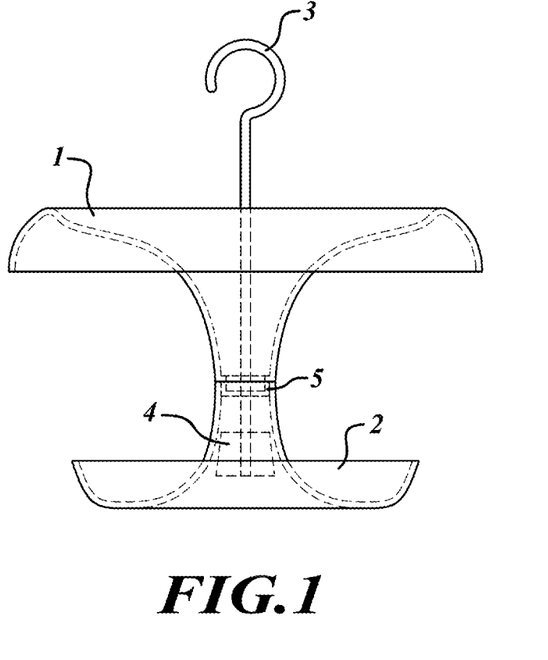
FIG. 1 is a side view of the bird feeding device according to one exemplary embodiment of the subject matter described herein.
Figure 2:
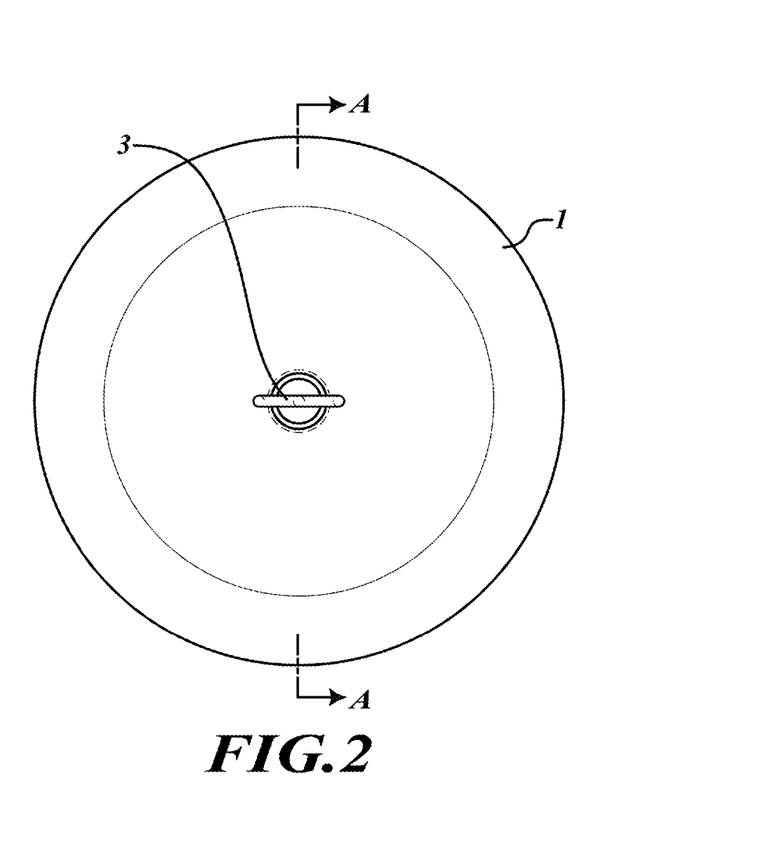
FIG. 2 is a top view of the bird feeding device according to one exemplary embodiment of the subject matter described herein.
Figure 3:
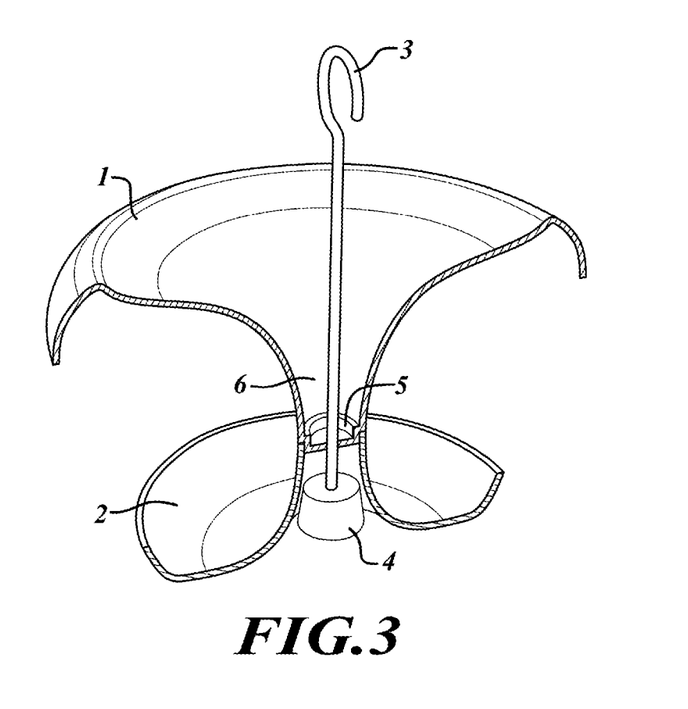
FIG. 3 is a sectional perspective view of the Part A of the bird feeding device according to one exemplary embodiment of the subject matter described herein as shown in FIG. 2.
Figure 4:
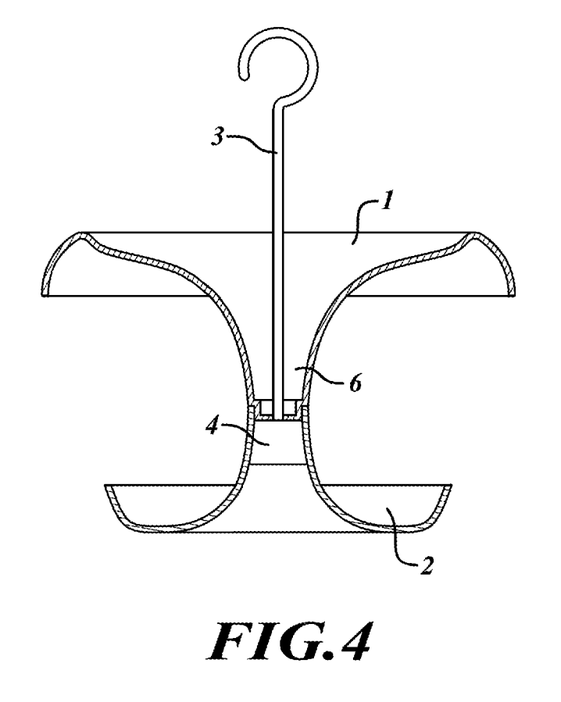
FIG. 4 is sectional view of the bird feeding device according to one exemplary embodiment of the subject matter described herein in a state of water storage.
Figure 5:
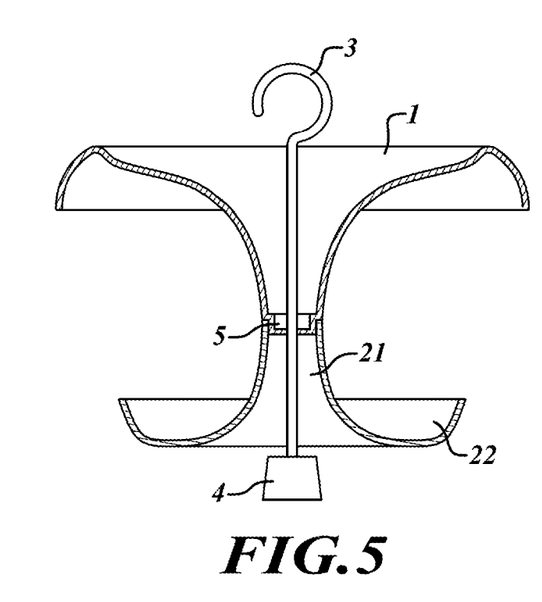
FIG. 5 is sectional view of the bird feeding device according to one exemplary embodiment of the subject matter described herein in a state of water discharge.
Figure 6:
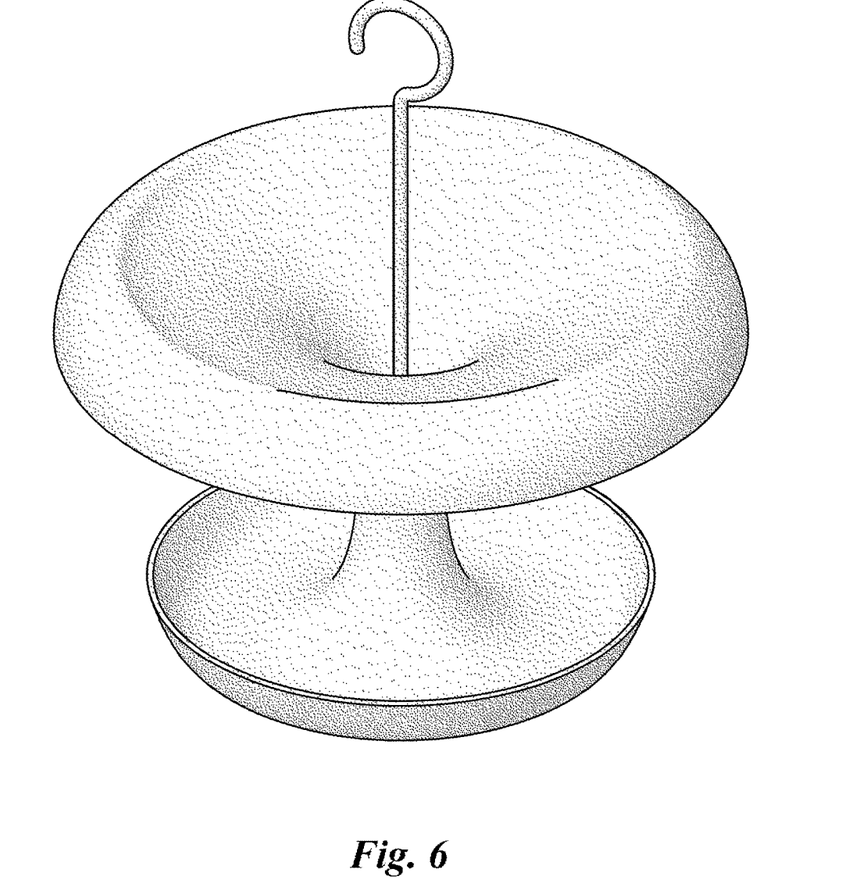
FIG. 6 is a perspective view of a bird feeding device in accordance with an embodiment described in the present application.
Figure 7:
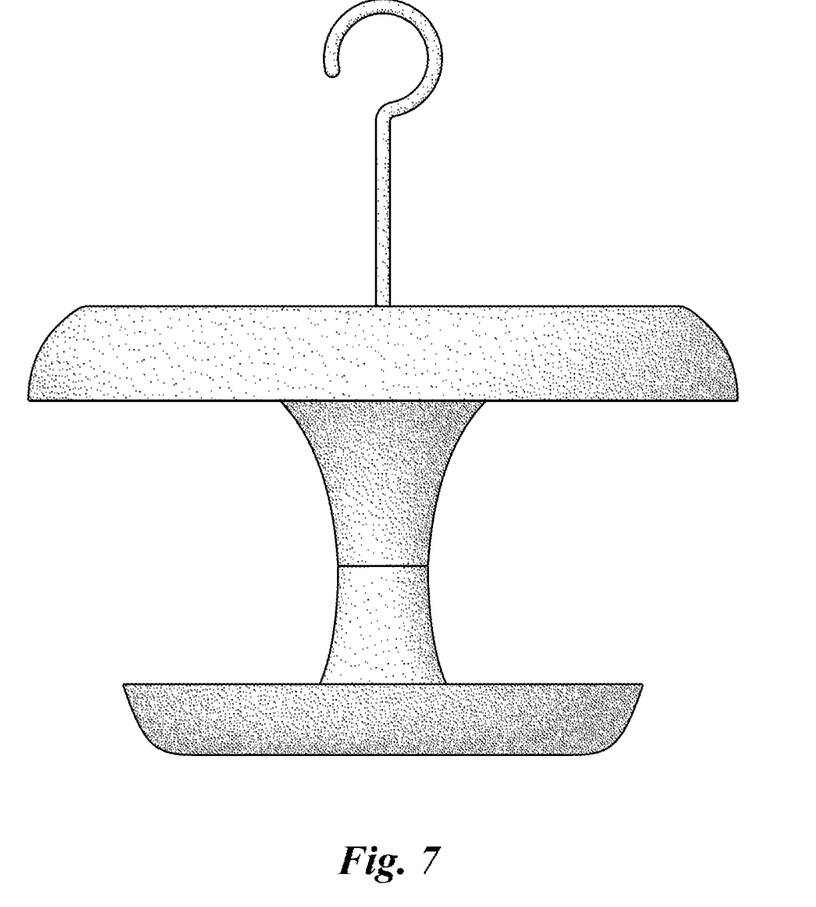
FIG. 7 is a front side view of a bird feeding device in accordance with an embodiment described in the present application.
Figure 8:
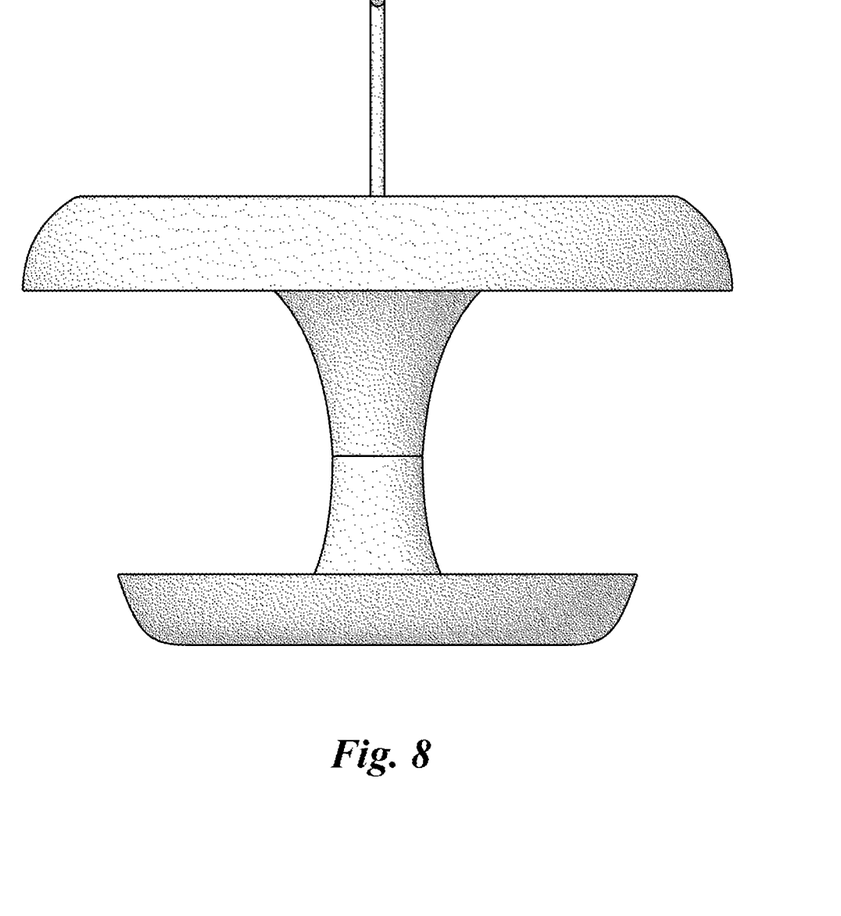
FIG. 8 is a right side view of a bird feeding device in accordance with an embodiment described in the present application, the left side view of the bird feeding device in accordance with FIG. 8 being substantially a mirror image of the right side view illustrated in FIG. 8.
Figure 9:
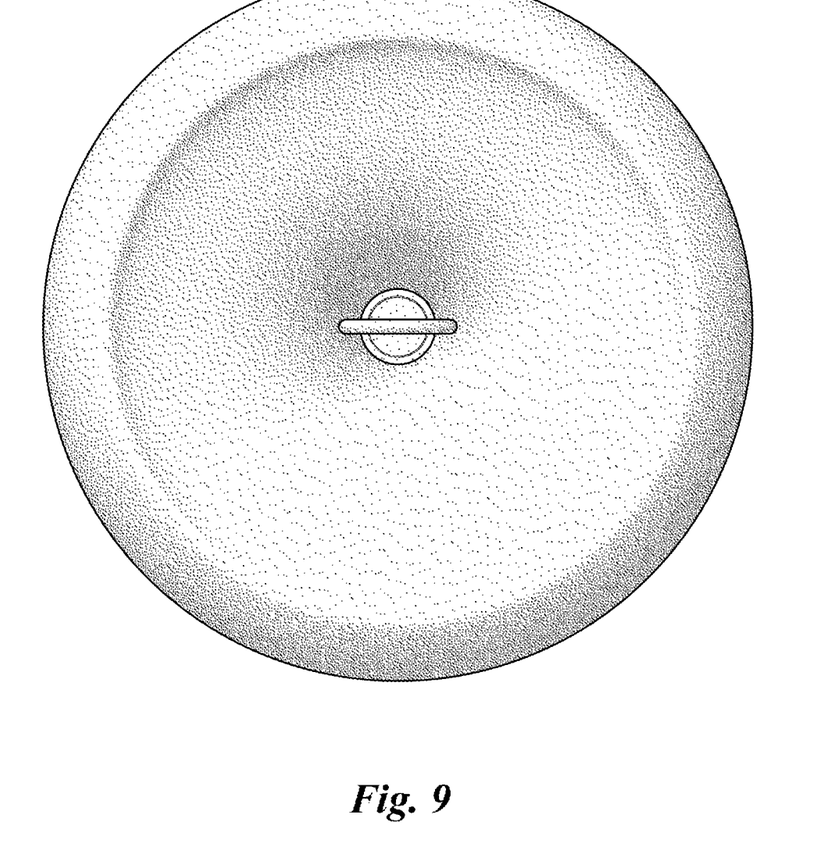
FIG. 9 is a top plan view of a bird feeding device in accordance with an embodiment described in the present application.
Figure 10:
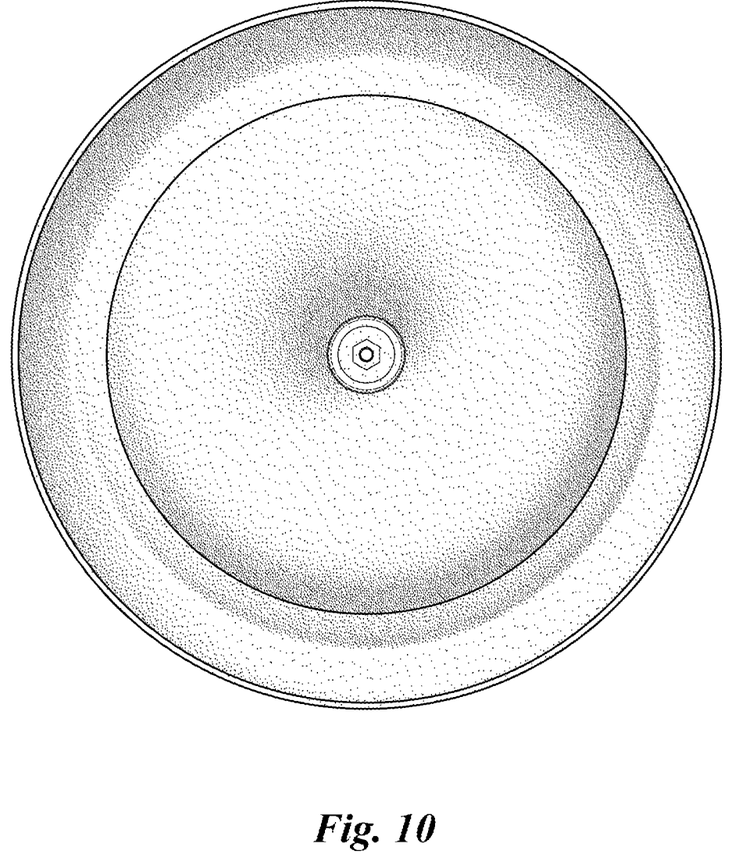
FIG. 10 is a bottom plan view of a bird feeding device in accordance with an embodiment described in the present application.

The specific construction of the bird feeding device according to an exemplary embodiment will be described below with reference to FIGS. 1 to 5, in which FIGS. 1 to 3 show an overall configuration of the bird feeding device according to an exemplary embodiment. FIG. 4 shows the configuration of the bird feeding device according to an exemplary embodiment in the state of water storage, and FIG. 5 shows the configuration of the bird feeding device according to an exemplary embodiment in the state of water discharge.

As shown in FIGS. 1 to 3, the bird feeding device comprises a water storage part 1, a food storage part 2, a hook 3 and a column stopper 4, in which the water storage part 1 is arranged above the food storage part 2, and water storage part 1 and the cylindrical portion 21 of the food storage part 2 together form a communicating cylinder portion 6, the column stopper 4 is arranged within the communicating cylinder portion 6. The hook 3 is connected to the column stopper 4; in addition, the hook 3 can be hung or hooked on an external object to suspend the entire bird feeding device.

Further, the bird feeding device further comprises a blocking portion 5. When the bird feeding device is hung on an external object, the blocking portion 5 is able to prevent the column stopper 4 from moving further upwards.

The above-mentioned components will be described in detail below.

The water storage part 1 is made of a material such as plastic or glass. The water storage part 1 according to one embodiment of the subject matter described herein is formed in a cylindrical shape to store water in the cylindrical interior thereof. In the present embodiment, the water storage part 1 is formed in a hollow bell shape facing upward, that is, the lower opening has the smallest inner diameter. According to the present invention, the shape of the water storage part 1 is not limited to the above-described shape shown in the drawings. The water storage part 1 can be in any hollow shape as long as it is able to store water. That is, for example, the water storage part 1 may be in an angular shape and so on.

The food storage part 2 can be made of a material such as plastic or glass, and is connected to the water storage part 1, so that the water storage part 1 is located directly above the food storage part 2. The food storage part 2 may be formed integrally with the water storage part 1 so as to be continuously formed directly below the water storage part 1.

The food storage part 2 according to the embodiment of the subject matter described herein has a cylindrical portion 21 in the center of the radial direction, and has a disc-shaped portion 22 at the periphery of the radial direction, as shown in FIG. 5.

The upper opening portion of the cylindrical portion 21 has a structure in a shape the same as the shape of the lower opening portion of the water storage part 1. In this embodiment, it is in a cylindrical shape to communicate with the water storage part 1. In addition, in the present embodiment, the cylindrical portion 21 is in a hollow bell shape facing down, that is, the upper opening portion of the cylindrical portion 21 has the smallest inner diameter, and this diameter is substantially the same as the diameter of the lower opening portion of the water storage part 1. In this way, the water storage part 1 and the food storage part 2 can be connected and sealed together at the jointing position of these two opening portions. The specific connection manner may be bonded together with glue, or engaged together with snap or thread, and so on.

By way of the connection mentioned above, the water storage part 1 and the food storage part 2 can communicate, so as to form a communicating cylinder portion 6 that goes throughout in the vertical direction. The communicating cylinder portion 6 is largely in the shape of an hourglass, that is, in the vertical direction, the middle part has the smallest diameter. In this embodiment of the subject matter described herein, the communicating cylinder portion 6 has the smallest diameter at the location where the water storage part 1 and the food storage part 2 are connected to each other.

The food storage part 2 forms a disk-like portion 22 at the periphery of the radial direction, which is continuous with the cylindrical portion 21 of the food storage part 2, and extends towards a direction opposite to the facing direction of the cylindrical portion 21. That is, it extends upwards for holding the food for birds. However, it is noted that the shape of the disk-like portion 22 is not limited to the shape shown in the drawings; it can be in other shapes, such as in a square shape, and the like, as long as the shape allows it to hold the food for birds.

The shape of the food storage part 2 according to the embodiment of the subject matter described herein is not limited to the above-described shape as shown in the drawings, as long as the storage part 2 can form the communicating cylinder portion 6 together with the water storage part 1 and can hold the food for birds. For example, the cylindrical portion 21 may have an angular shape corresponding to the angular shape of the water storage part 1, and the disk-like portion 22 can be in a polygonal shape corresponding to the angular shape as well.

The column stopper 4 can be made of a material elastically deformable and restorable, such as rubber and the like, the side surface of the column stopper 4 is formed to have a shape conforming to the internal shape of the communicating cylinder portion 6. In the present embodiment, the circumferential surface is a conical surface. In addition, the diameter of the column stopper 4 is slightly larger than the inner diameter of the smallest diameter portion of the communicating cylinder portion 6. In the present embodiment, the diameter of the column stopper 4 is slightly larger than the inner diameter at the connecting portion between the water storage part 1 and the food storage part 2.

The column stopper 4 is connected to the hook 3 on the upper surface of the device. The hook 3 can be made of an iron wire, a cord, a steel wire, a rope or the like, and the top of the hook 3 can be hooked or suspended on an external object so that the bird feeding device is suspended on the external object.

When the hook 3 is hooked or suspended on an external object, due to the weight of the bird feeding device, the water storage part 1 and the food storage part 2 move downward with respect to the column stopper 4, that is, the column stopper 4 moves upwards in the communicating cylinder portion 6 with respect the water storage part 1 and the food storage part 2. As a result, as the column stopper 4 moves upwards in the communicating cylinder portion 6, the column stopper 4 gradually abuts against the inner peripheral wall of the column stopper 4 to be elastically deformed. In the present embodiment, the column stopper 4 abuts against the inner surface of the cylindrical portion 21 of the food storage portion 2, resulting in an elastic deformation of the column stopper 4.

When the column stopper 4 moves upwards in the communicating cylinder portion 6 to reach the smallest diameter portion thereof, at this moment, the inner diameter of the communicating cylinder portion 6 is the smallest, and accordingly the elastic deformation of the column stopper 4 reaches its largest degree. In addition, since the diameter of the column stopper 4 is larger than the inner diameter of the smallest diameter portion, the column stopper 4 is able to seal the smallest diameter portion of the communicating cylinder portion 6, so as to block the communication between the water storage part 1 and the cylindrical portion 21 of the food storage part 2; and separate the communicating cylinder portion into upper and lower portions in a water-tight sealing manner. In this embodiment, as shown in FIG. 4, when the column stopper 4 moves to the connecting portion between the water storage part 1 and the food storage part 2, the column stopper 4 seals the connecting portion between the water storage part 1 and the food storage part 2, and separate the water storage part 1 from the food storage part 2 in a water-tight sealing manner. At this moment, the upper water storage part 1 can store water, for example, rain water, purified water, etc., and the disk-like portion 22 of the food storage part 2 can store food for birds.

In addition, a blocking portion 5 is provided on the inner wall of the smallest diameter portion of the communicating cylinder portion 6. In the present embodiment, the blocking portion 5 is arranged on the inner wall of the connecting portion between the water storage part 1 and the food storage part 2, so as to block the column stopper 4 from moving further up.

When the water in the water storage part 1 is to be replaced, the column stopper 4 is moved downward in the communicating cylinder portion 6 or the communicating cylinder portion 6 is made to move upward with respect to the column stopper. In this process, the column stopper 4 moves away from the smallest diameter portion of the communicating cylinder portion 6, the column stopper 4 gradually moves away from contacting with the inner wall of the communicating cylinder portion 6, so as to elastically restore to its original shape. When the column stopper 4 further moves downwards, the water storage part 1 and the food storage part 2 return to their original state in communication. In the present embodiment, as shown in FIG. 5, the water storage part 1 and the food storage part 2 move upward with respect to the column stopper 4, or the column stopper 4 moves downward with respect to the water storage part 1 and the food storage part 2. As a result, the column stopper 4 gradually moves away from the connecting portion between the water storage part 1 and the food storage part 2, accordingly, it does not abut against the inner wall of the cylindrical portion 21 of the food storage part 2, and elastically restores to its original shape. As the column stopper 4 moves further downward, the water storage part 1 and the storage part 2 gradually return to their original state in communication. Accordingly, the water stored in the water storage part 1, due to its weight, flows out from the lower opening of the cylindrical portion 21 of the storage part 2 through the communicating cylinder portion 6.

Thus, by way of the up and down movements of the column stopper 4 within the communicating cylinder portion 6, that is, the relative movement of the water storage part 1 and the food storage part 2 with respect to the column stopper 4, the water storage part 1 and the food storage part 2 are made to communicate with each other, and accordingly, the water flows from the lower portion of the food storage part 2 through the communicating cylinder portion 6.

In the construction of the bird feeding device described above, the water storage part is located above the food storage part, so the entire bird feeding device occupies only a small area, and thus saves space. In addition, a column stopper is provided for the device, which functions to completely separate the water storage part and the food storage part, so as to ensure the cleanness of the water and food stored therein. On the other hand, due to the design of the column stopper, it becomes easier to change the water in the bird feeding device, and device can be cleaned easily. Thus, the water in the bird feeding device can be changed in time and the operation for water change is simplified.

The foregoing is just an exemplary embodiment of the disclosed subject matter, and the disclosed subject matter is not limited to this exemplary embodiment. For example, the water storage part 1 and the food storage portion 2 may be in an angular shape or other shapes, as long as they can be sealed and communicate with each other to form the communicating cylinder portion 6, and can respectively store water or food. In addition, as for the column stopper 4, it only needs to be in a shape corresponding to the shape pf the peripheral surface of communicating portion. The communicating cylinder portion 6 may not have a smaller diameter portion at the connection portion between the water storage part 1 and the food storage portion 2, that is, the smaller diameter portion may be in the water storage part 1 or the food storage portion 2, as long as the inner diameter of other portions are larger than the inner diameter of this portion. It is preferable that the shape of the communicating portion is streamlined so as to facilitate cleaning, water flow and placing the food for birds. In addition, the number of levels of the food storage portion 2 is not limited, that is, it may have a multilayer structure.

The above description is only for an embodiment of the present application and is not intended to limit the scope of the subject matter described herein'. Various changes and modifications may be made by those skilled in the art to the subject matter described herein. Without departing from the mechanism and principle of the subject matter described herein, any modifications, equivalent substitutions, improvements, and the like are included within the scope of the claims of the subject matter described herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A water storage type bird feeding device, the bird feeding device comprising:
   a water storage part, which is a cylindrical shape for water storage;
   a food storage part, which is arranged below the water storage part and comprises a cylindrical portion and a disk-like portion, the cylindrical portion and the disk-like portion in communication to form a communicating cylinder portion, the disk-like portion configured to store food;
a column stopper, movable up and down in the communicating cylinder portion;
a hook, connected to the column stopper for hanging the bird feeding device, wherein
the communicating cylinder portion comprises a smallest diameter portion at a central portion thereof in a vertical direction, and the diameter of the column stopper is larger than an inner diameter of the smallest diameter portion.

2. The bird feeding device according to claim 1, wherein, the bird feeding device further comprises a blocking portion, which is arranged on an inner wall of the smallest diameter portion of the communicating cylinder portion to block the column stopper form moving up and down.

3. The bird feeding device according to claim 1, wherein, when the column stopper moves upwards to the smallest diameter portion, the column stopper has an elastic deformation to seal the smallest diameter portion, and block the communication between the water storage part and the cylindrical portion of the food storage part to divide the communicating cylinder portion into two parts;
and when the column stopper moves downwards to the smallest diameter portion, the column stopper has an elastic restoration to resume the communication between the water storage part and the food storage part.

* * * * *